(12) United States Patent
Tucker et al.

(10) Patent No.: US 11,818,448 B2
(45) Date of Patent: Nov. 14, 2023

(54) ANTI-FOG MEASURES FOR IMAGE CAPTURE DEVICE

(71) Applicant: GoPro, Inc., San Mateo, CA (US)

(72) Inventors: Joseph Tucker, Foster City, CA (US); Matthew Feddersen, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/071,131

(22) Filed: Nov. 29, 2022

(65) Prior Publication Data

US 2023/0091601 A1    Mar. 23, 2023

Related U.S. Application Data

(63) Continuation of application No. 16/984,660, filed on Aug. 4, 2020, now Pat. No. 11,533,415.

(60) Provisional application No. 62/900,916, filed on Sep. 16, 2019.

(51) Int. Cl.
*H04N 23/52* (2023.01)
*H04N 23/55* (2023.01)

(52) U.S. Cl.
CPC ............. *H04N 23/52* (2023.01); *H04N 23/55* (2023.01)

(58) Field of Classification Search
CPC .............................. H04N 23/52; H04N 23/55
See application file for complete search history.

(56) References Cited

U.S. PATENT DOCUMENTS

| | | | |
|---|---|---|---|
| 6,772,448 B1 | 8/2004 | Hockaday | |
| 8,619,185 B2 | 12/2013 | Yi | |
| 9,661,235 B2 * | 5/2017 | Petty | H04N 23/57 |
| 11,533,415 B2 | 12/2022 | Tucker | |
| 2021/0084207 A1 | 3/2021 | Tucker | |

* cited by examiner

*Primary Examiner* — Seung C Sohn
(74) *Attorney, Agent, or Firm* — Young Basile Hanlon & MacFarlane, P.C.

(57) ABSTRACT

An image capture device includes a housing and a lens cavity comprising an external lens that separates the lens cavity from an exterior environment. The lens cavity is connected with an inside of the housing. The image capture device includes a door positioned on the housing that opens the inside of the housing to the exterior environment. The image capture device includes a vent positioned on housing so that moisture can be vented from housing and the lens cavity to the exterior environment.

20 Claims, 10 Drawing Sheets

ANTI-FOG MEASURES FOR IMAGE CAPTURE DEVICE

CROSS REFERENCE TO RELATED APPLICATION(S)

This application is a continuation of U.S. application Ser. No. 16/984,660, filed Aug. 4, 2020, which claims priority to U.S. Provisional Application No. 62/900,916, filed Sep. 16, 2019, the contents of which are incorporated by reference herein in their entirety.

TECHNICAL FIELD

This disclosure relates to image capture devices, and more specifically, to submersible cameras with anti-fog or fogging reduction features for improved capture clarity in a variety of operational environments.

BACKGROUND

Many physical activities, such as boating, surfing, swimming, skiing, etc. can occur in environments where moisture content or relative humidity levels within the environment are high. Use of traditional cameras in these environments often requires the addition of cumbersome protective housings to block moisture from negatively impacting sensitive camera electronics. However, these housings can be bulky and sensitive to fogging if sealing is not sufficient or if a change in the environment, such as a switch from a warm environment to a cold, wet environment occurs rapidly.

Photography during physical activity has been improved by the use of simple-to-operate, lightweight, compact cameras with integrated waterproofing features such as enhanced seals that remove the need for additional protective housings in underwater, rainy, snowy, or humid environments. However, some forms of moisture intrusion, such as a user loading a wet battery into a dry camera or operating a camera for a long period of time in a warm, humid, and/or wet environment, cannot be addressed by enhanced sealing alone.

SUMMARY

Disclosed herein are implementations of an image capture device. The image capture device includes a housing; a lens cover disposed on the housing; a lens disposed within the housing beneath the lens cover; a lens cavity defined between the lens and the lens cover; a battery cavity defined within the housing; a lens vent fluidly coupling the lens cavity and the battery cavity; a battery disposed within the battery cavity; and a desiccant patch coupled to a side of the battery. Moisture introduced into the battery cavity by the battery, the lens cavity, or the lens vent is absorbed by the desiccant patch.

Disclosed herein are implementations of an image capture device including a housing and a battery cavity defined within the housing. The image capture device includes a removable door separating the battery cavity and an external environment and a lens disposed in the housing proximate to the battery cavity. The image capture device includes a lens cover disposed over the lens, contacting the housing, and fluidly separating the lens from an external environment and includes a lens cavity defined between the lens and the lens cover. The image capture device includes a seal obstructing a channel that fluidly couples the lens cavity and the battery cavity and a housing vent that is fluidly couple the battery cavity and the external environment.

Disclosed herein are implementations of an image capture device including a battery cavity and a housing surrounding the battery cavity. The image capture device includes a lens insertable into the housing at a location proximate to the battery cavity and a lens cover contacting the housing and fluidly separating the lens from an external environment. The image capture device includes a lens cavity between the lens and the lens cover and a seal obstructing a fluid path between the lens cavity and the battery cavity. The image capture device includes a housing vent connecting the battery cavity and an external environment surrounding the image capture device.

Disclosed herein are implementations of an image capture device including a housing and a lens cavity that includes an external lens that separates the lens cavity from an exterior environment. The lens cavity is connected with an inside of the housing. The image capture device includes a door positioned on the housing that opens the inside of the housing to the exterior environment. The image capture device includes a vent that extends from the inside of the housing to an external surface of the housing so that moisture can be vented from the housing and the lens cavity to the exterior environment after the door is opened and closed.

Disclosed herein are implementations of an image capture device including a housing, a lens cavity, and a channel that fluidly connects the lens cavity and the housing. The image capture device includes a removable lens that connects with and enclose the lens cavity. The image capture device includes a vent that is switchable between an open and closed position, extends between an inside of the housing an external environment, and releases air and/or moisture from the lens cavity and the housing when the removable lens is connected with and encloses the lens cavity.

Disclosed herein are implementations of an image capture device including a housing and a lens assembly that is free of a fluid connection with an exterior environment. The image capture device includes a channel that fluidly connects the lens assembly and the housing and a door positioned on the housing. The image capture device includes a removable battery that moves through the door and a vent that extends between an inside of the housing and the exterior environment that vents moisture from the inside of the housing and the lens assembly to prevent fog from obstructing the lens assembly when the vent is open. The housing is free of fluid connection with the exterior environment when the door is closed and the vent is closed.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
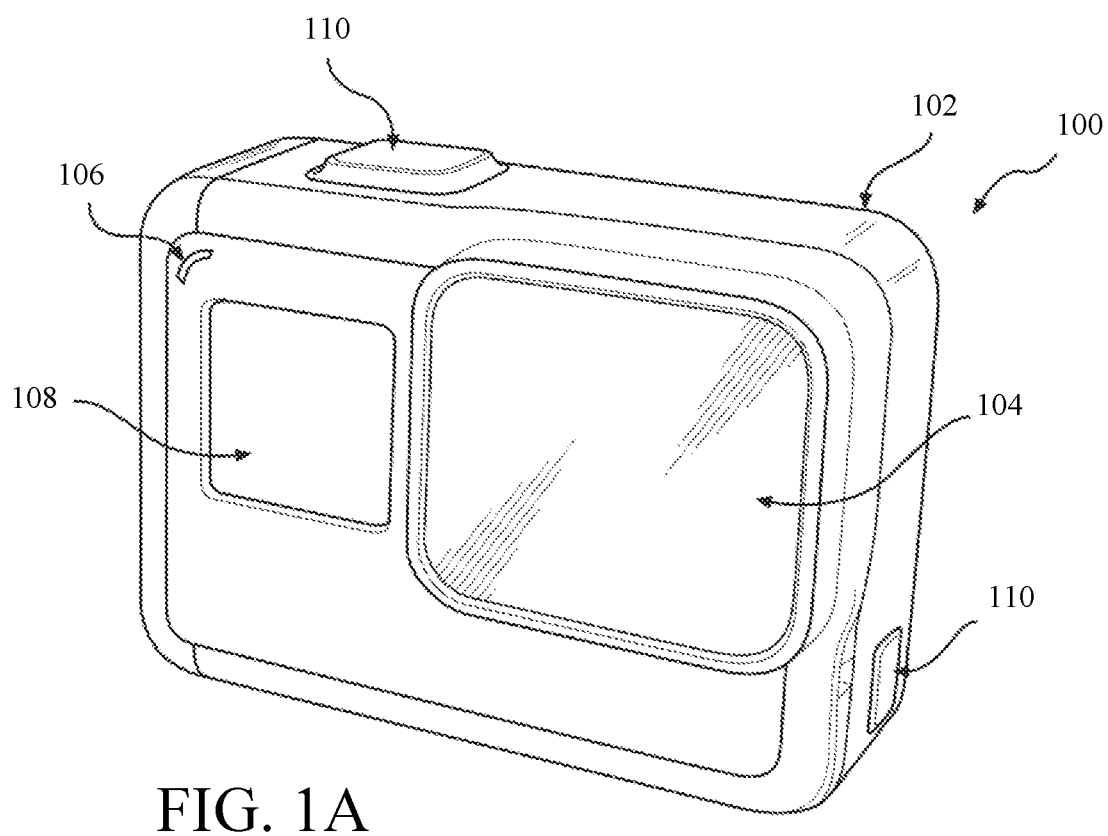
FIGS. 1A-D are isometric views of an example of an image capture device.

Given operation in a variety of situations that may introduce moisture to an image capture device (e.g. humid environment, loading a wet battery, etc.) and the desire to avoid external moisture reduction solutions (e.g., external housing with additional seals) for operational convenience, internal moisture reduction is an important goal for small, convenient-to-use cameras in order to avoid fogging of a lens and/or lens cover of the image capture device. One mechanism to reduce moisture in any operating environment is affixing a desiccant patch to an outer surface of a battery that is loaded into a battery cavity in the image capture device. The battery and desiccant patch can be positioned within a battery cavity proximate to passages fluidly coupling other portions of the image capture device such as the lens cavity. In this way, the desiccant patch can attract and trap any moisture introduced into the image capture device and reduce or eliminate a potential for fogging of the lens cover or the lens.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
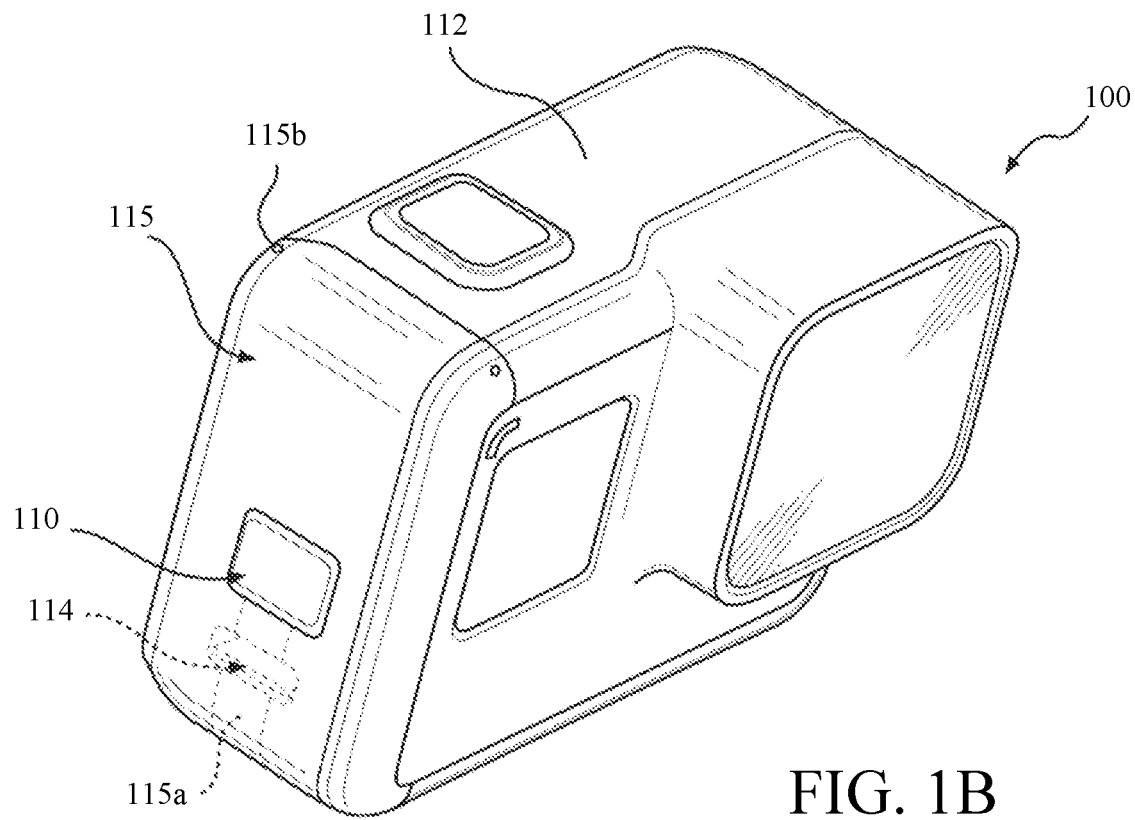
Figure 1C:
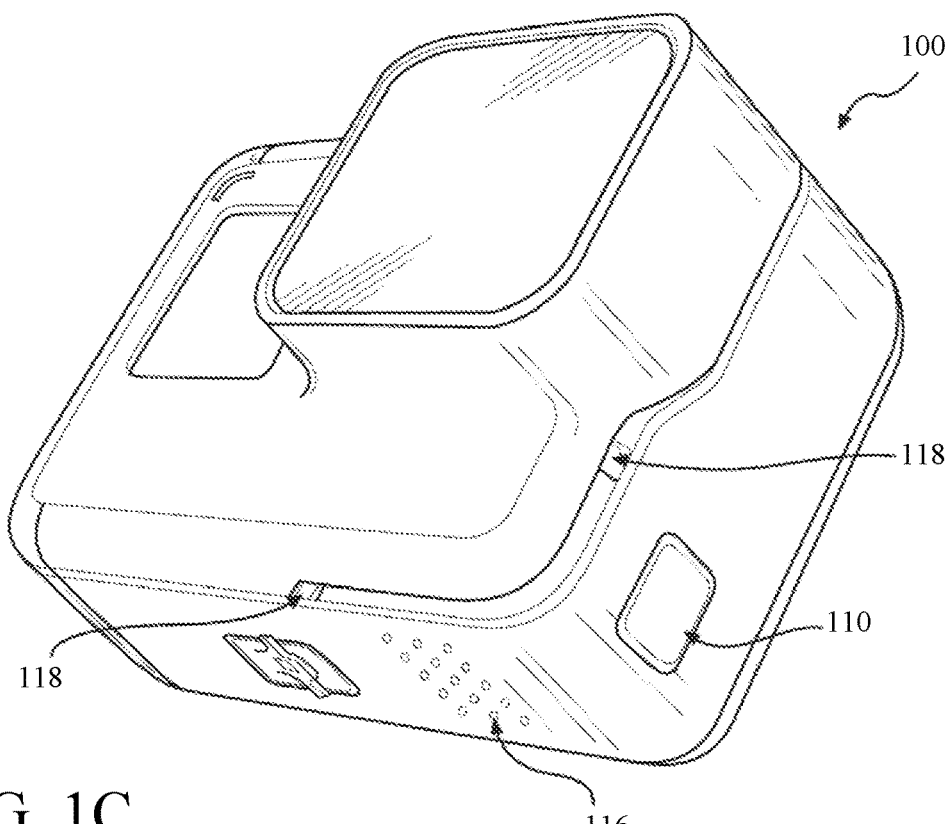
Figure 1D:
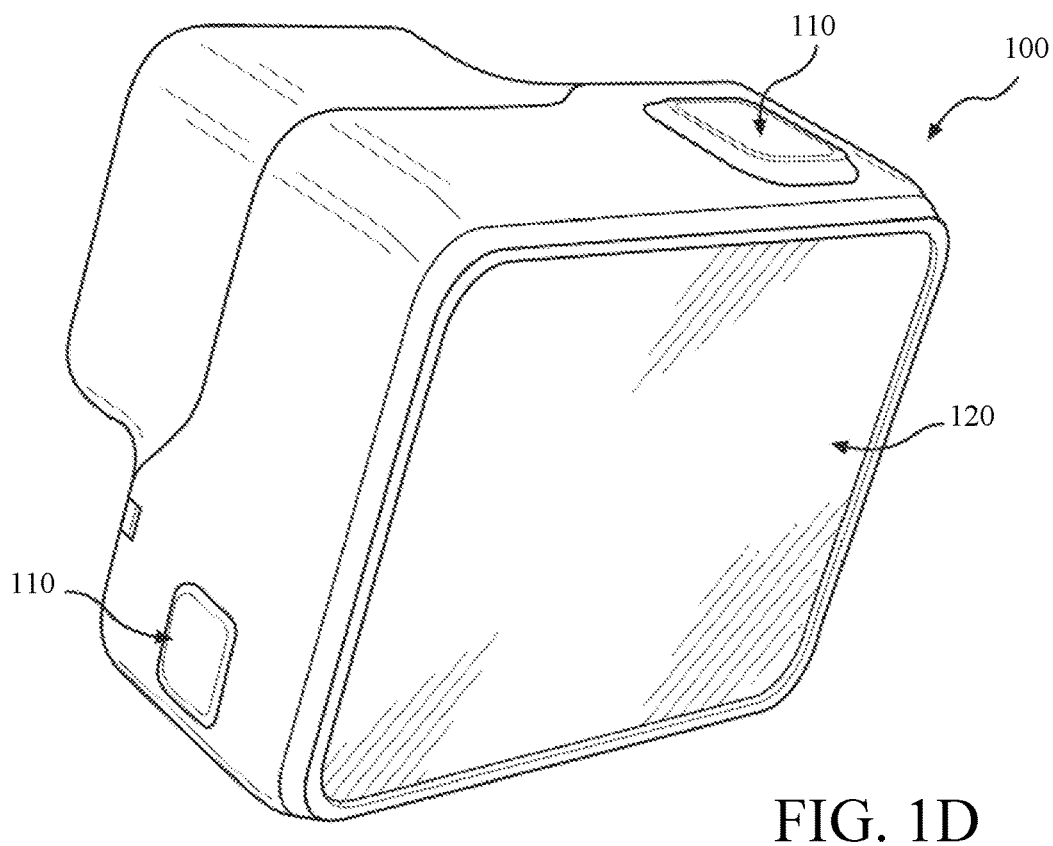

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115*a* (e.g., hidden as indicated using dotted lines) that is opened by engaging the associated button 110 as shown.

The removable door 115 can also be secured to the image capture device 100 using a hinge mechanism 115*b*, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115*a* and the hinge mechanism 115*b* allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal–oxide–semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
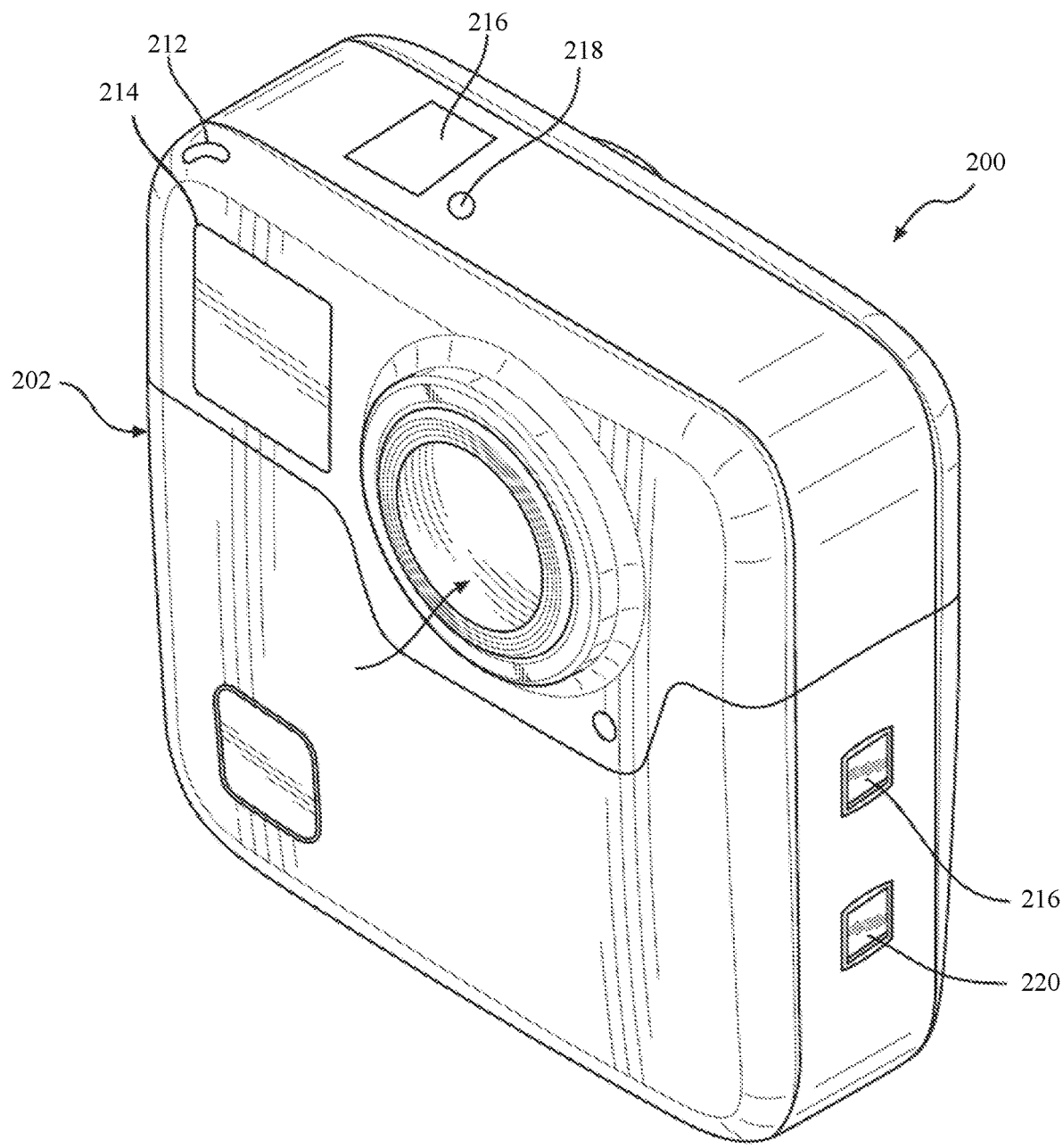
FIGS. 2A-B are isometric views of another example of an image capture device.
Figure 2B:
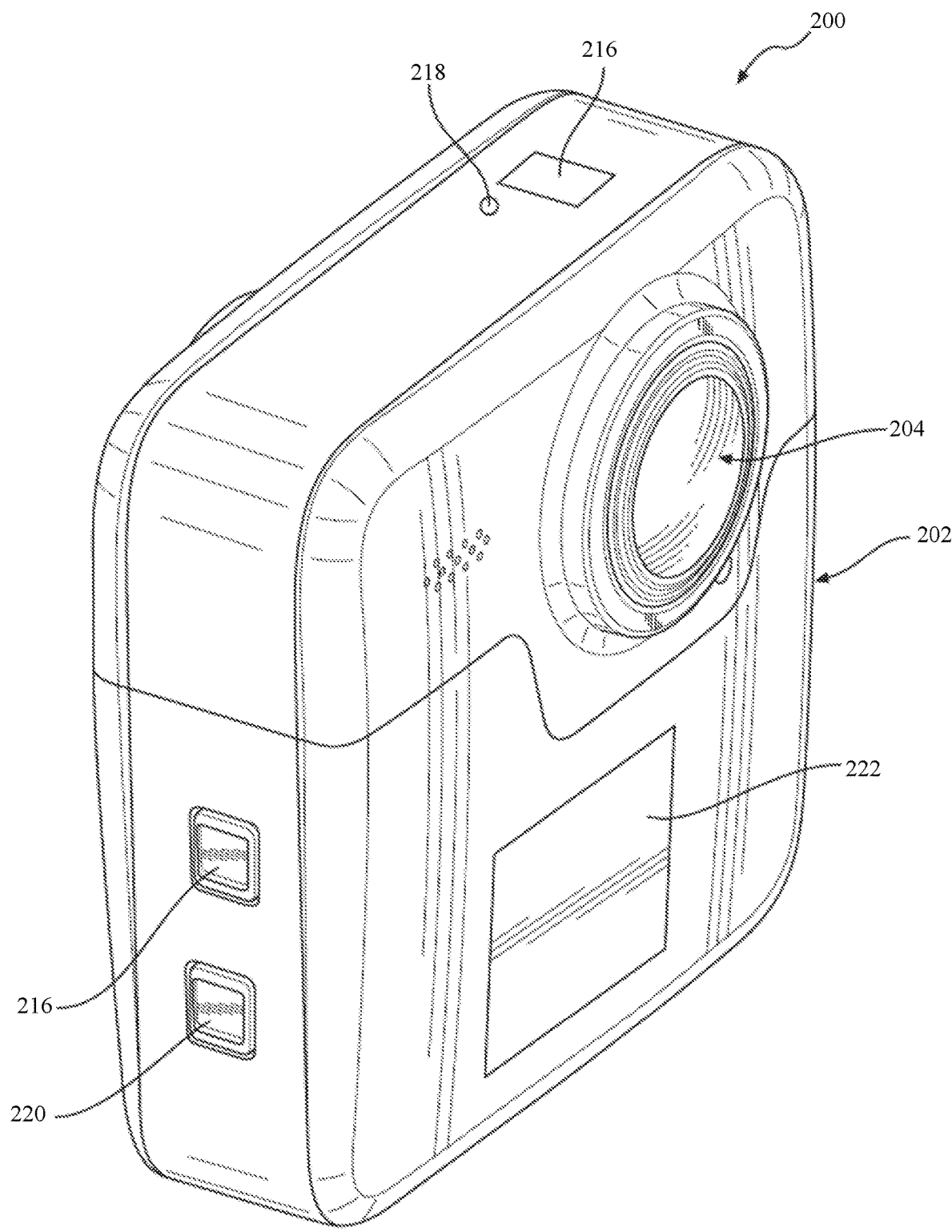

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
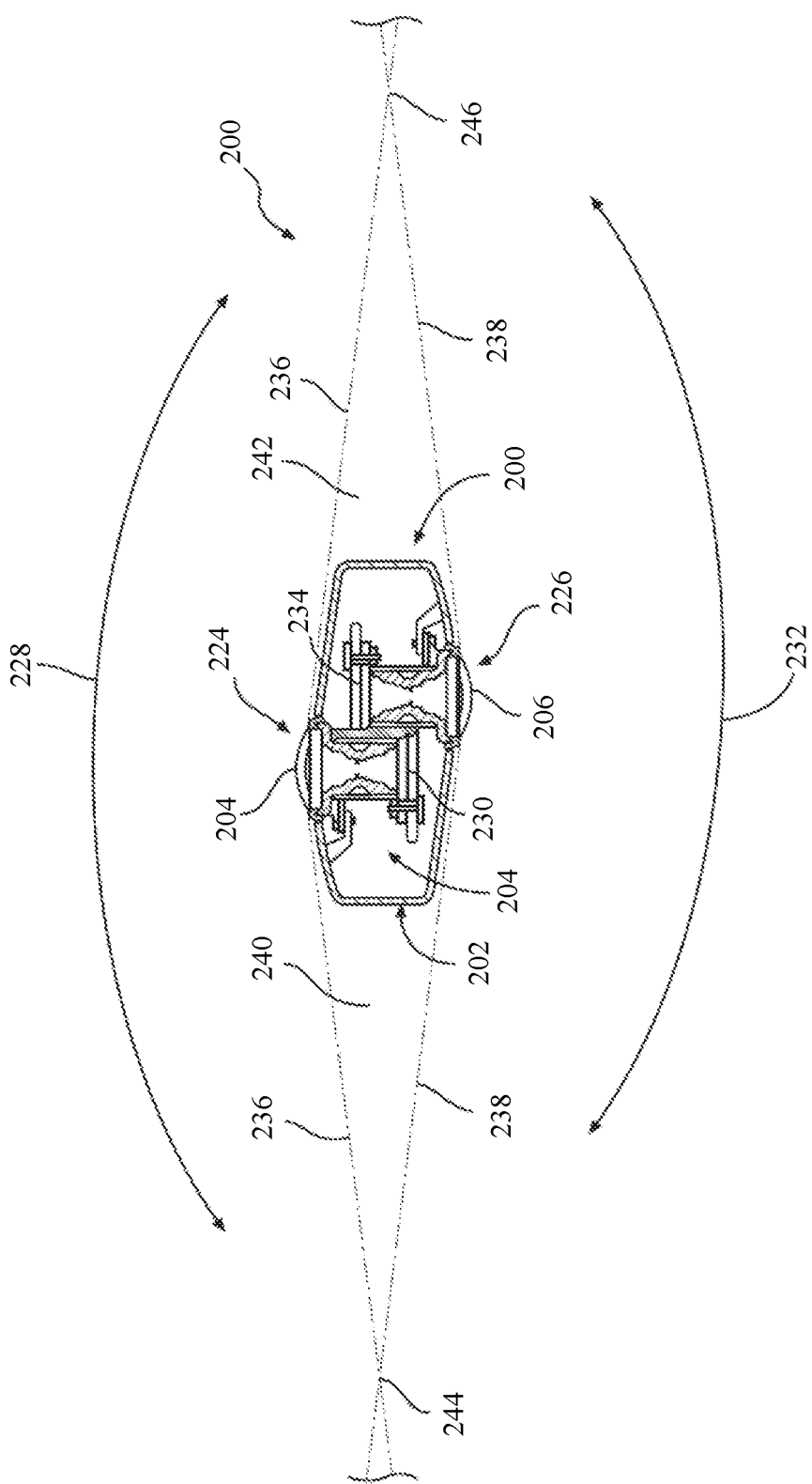
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
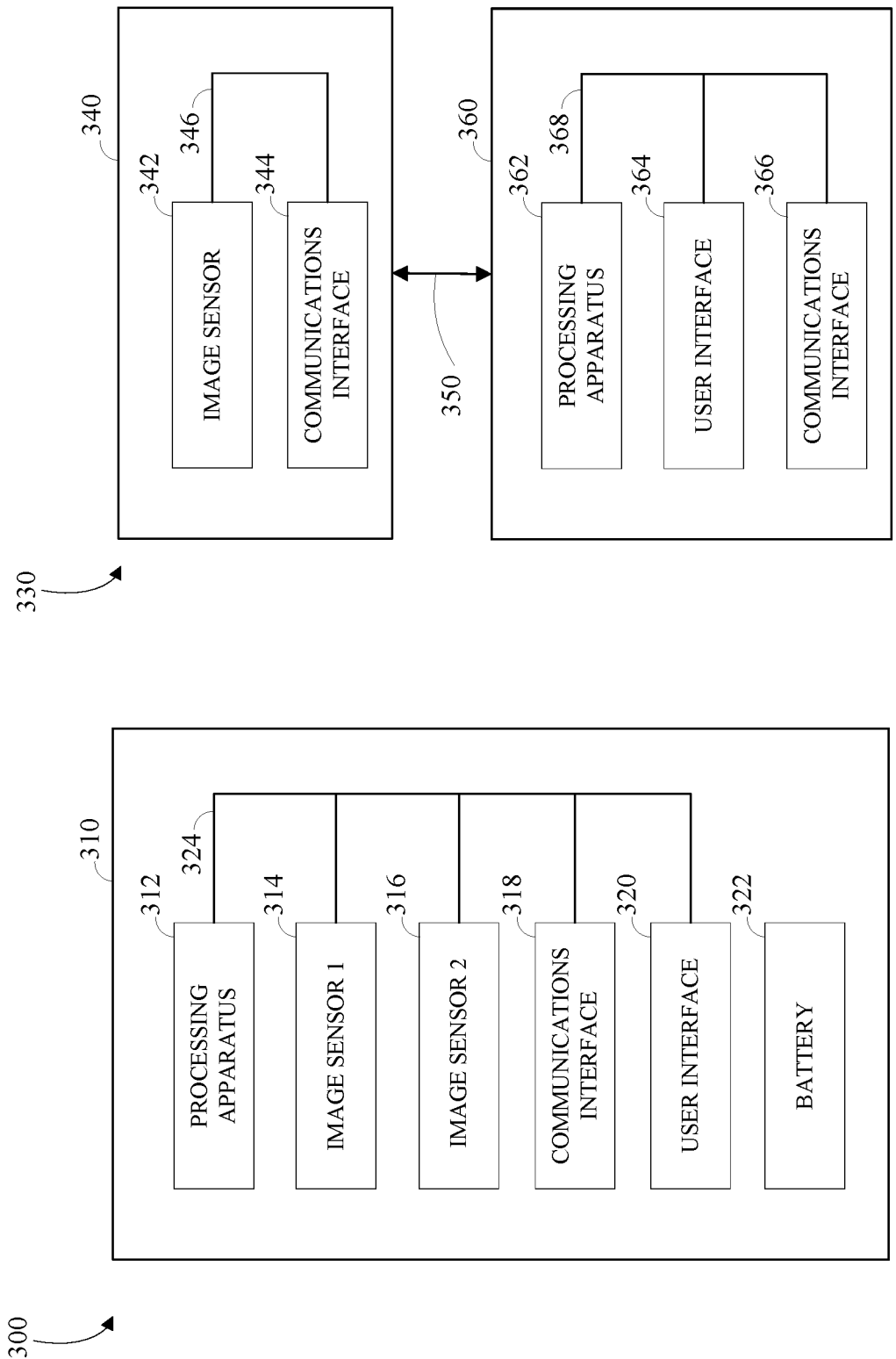
FIGS. 3A-B are block diagrams of examples of image capture systems.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C. The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

Figure 4:
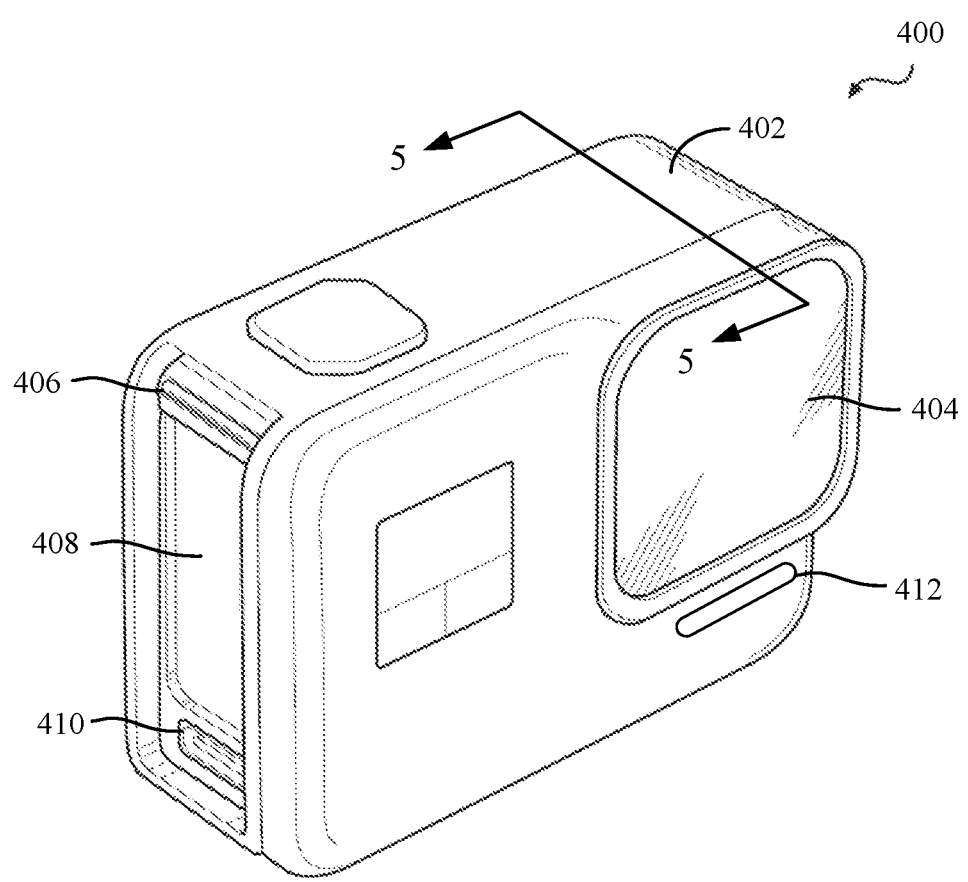
FIG. 4 is an isometric view of an example of another image capture device.

FIG. 4 shows another image capture device 400. The image capture device 400 can be similar to the image capture devices 100, 200, 300 of FIGS. 1-3B. For example, the image capture device 400 can include a body or housing 402 having a lens cover 404 structured on a front surface of the housing 402, various indicators on the front of the surface of the housing 402 (such as LEDs, displays, and the like), various input mechanisms (such as buttons, switches, and touch-screen mechanisms), and electronics (e.g., imaging electronics, power electronics, etc.) internal to the housing 402 for capturing images via a lens (not shown) situated beneath the lens cover 404 and/or for performing other functions. The image capture device 400 may be configured to capture images and video and to store captured images and video for subsequent display or playback.

The image capture device 400 in the example in FIG. 4 is shown without a removable door, that is, the removable door has been removed to allow the user of the image capture device 400 to remove or insert a battery (not shown) or otherwise couple or use the image capture device 400 with various accessories (e.g., expansion packs, alternate batteries, etc., not shown). When present, the removable door can be removably secured in a closed position, for example, using fastening structures (e.g., hinge structures or mechanisms and/or latch structures or mechanisms) that engage retention features 406 of the housing 402 of the image capture device 400.

The retention features 406 integrated into the housing 402 of the image capture device 400 can include hinge structures, such as pins, bars, clamps, etc. The retention features 406 can also include depressions, cavities, or channels defined on various surfaces, both internal and external, of the housing 402 of the image capture device 400. These are only examples of the retention features 406. Other types of integrated retention features 406 (not shown) on the housing 402 of the image capture device 400 are also possible.

As shown in FIG. 4, the image capture device 400 can define a battery cavity 408 and include an imaging communication interface 410 that can be covered by the removable door (not shown). In the closed position of the removable door (not shown), the user is prohibited access to the battery cavity 408 and the imaging communication interface 410 by the removable door. In the removed position of the removable door (e.g., as shown in FIG. 4), any fastening structures (not shown) present on the removable door are separated from the retention features 406 and the user is allowed unencumbered access to the battery cavity 408 and the imaging communication interface 410. When the removable door is opened or removed (e.g., as shown in FIG. 4), air, moisture, or humidity may be passively vented from the battery cavity 408.

The image capture device 400 can include a housing vent 412 between the housing 402 and an interior of the image capture device 400. The housing vent 412 can serve to equalize pressure between internal components within the image capture device 400 and an external environment surrounding the image capture device 400. The housing vent 412 can also serve as a path for heat to exit the housing 402. The housing vent 412 can be fluidly coupled to the battery cavity 408 to support pressure equalization. Additional fluid couplings within the housing 402 of the image capture device 400 are described herein in reference to FIG. 5.

Figure 5:
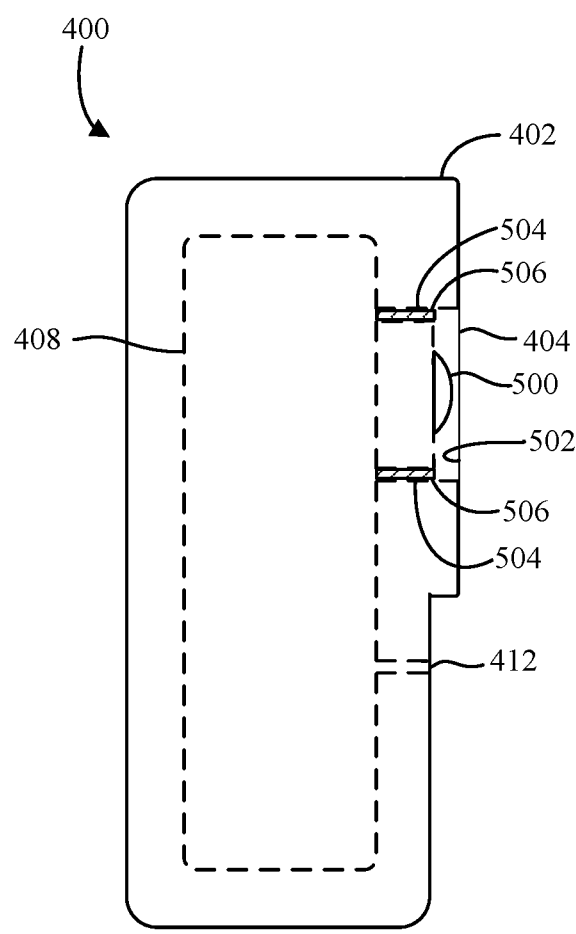
FIG. 5 is a cross-sectional view of the image capture device of FIG. 4 through section 5-5.

FIG. 5 is a cross-sectional view of the image capture device 400 of FIG. 4 through section 5-5 with representative cavities shown for explanation purposes only. The cavities described may have different dimensions or locations within the image capture device 400, but are simplified for the purpose of describing potential sources of moisture within an otherwise fluidly sealed image capture device. The image capture device can be fluidly sealed when an access door (i.e., a door that is openable and closeable) or removable door (not shown) is present and secured to the housing 402.

The housing 402 forms an outer perimeter of the image capture device 400. The lens cover 404 is located at an upper-right portion of the cross-section of FIG. 5. The lens cover 404 contacts the housing 402 and sits outboard of a lens 500. The space between the lens 500 and the lens cover 404 defines a lens cavity 502. Both the lens 500 and the lens cover 404 are formed from transparent or light-transmissive materials (e.g., glass or acrylic). These materials can be susceptible to fogging under certain conditions such as increased environmental humidity levels and/or temperature changes.

The lens cavity 502 can be fluidly coupled to the battery cavity 408 by way of a lens vent 504. The lens vent 504 can surround the lens 500. In some examples, the lens 500 may have a generally cylindrical shape, and to surround the lens, the lens vent 504 may also have a tubular or generally cylindrical shape. Other shapes for the lens vent 504 are also possible. When the lens 500 has a tubular or generally cylindrical shape, an O-ring may surround the lens 500 and substantially block or obstruct fluid flow (i.e., air or water) between the lens cavity 502 and the battery cavity 408 so that fogging of the lens 500 is reduced. On the lens cover 404 and/or the lens 500, a glass coating may be applied that assists with reducing fogging of the lens cover 404 or the lens 500 when moisture is present in the lens cavity 502.

The lens vent 504 may be obstructed, for example, by a seal 506. The seal 506 is shown with a hatched pattern and may be designed such that no particulates are able to pass between the battery cavity 408 and the lens cavity 502 via the lens vent 504, but air, water, or both may still pass or move in order equalize pressure or moisture content between the battery cavity 408 and the lens cavity 502. However, in some examples, the seal 506 is impermeable such that particles, air, moisture, humidity, or any combination thereof are not prevented from entering (or leaving) the lens cavity 502 by way of the battery cavity 408. In this example, since the seal 506 is impermeable, the lens cavity 502 and the battery cavity 408 would lack a fluid connection. Whether the seal 506 is permeable, semi-permeable, or impermeable, the lens 500, the lens cover 404, or both may be removable so that the image capture device 400 can be more easily vented or flushed of air or moisture contaminants by exposing the lens cavity 502, the battery cavity 408, or both to the external environment. When the lens cover 404 is removed, the venting of air or moisture assists to keep the lens 500, the lens cover 404, or both free of fog. The seal 506 may be one or more of an open-cell foam, closed-cell foam, adhesive, semi-permeable ring, a rubber O-ring, or any combination thereof. The seal 506 may be composed of one or more of an acrylic, polyethylene, polyurethane, polyvinyl chloride, nitrile butadiene rubber, polyolefin, silicone, polychloroprene, ethylene propylene diene monomer rubber, styrene-butadiene, butadiene, blends thereof, or any combination thereof.

In conjunction, the seal 506 and the lens vent 504 may provide a channel or fluid path for passively moving moisture or air that has entered the lens cavity 502 to the outside environment when the battery cavity 408, the housing vent 412, or both are in fluid connection with the external environment. For example, the removable door (not shown) of the battery cavity 408 may be opened or removed so that the battery cavity 408 is exposed to the outside environment for venting purposes or exchanging the battery. In another example, the housing vent 412 provides a pathway for venting air or moisture from the battery cavity 408 by being openable or always open. The housing vent 412 may include a housing seal (not shown), which may be a similar structure or material to the seal 506, that can actively vent humidity by being selectively openable and closable or may passively vent air or humidity by being a permeable or semi-permeable seal 506. Situations may exist where one or both of the housing vent 412 and the battery cavity 408 are open so that air or moisture can be passively vented from the lens cavity 502, the battery cavity 408, or both. If air with increased humidity enters the lens cavity 502, the humidity may cause fogging of the lens 500 or the lens cover 404 depending on other environmental or operating conditions (e.g., temperatures extremes, long-duration operation of the image capture device 400, etc.). However, the fogging may be mitigated by the passive venting described here because the seal 506 is configured to move the humidity out of the lens cavity 502 when the internal components of the image capture device 400 are exposed to the outside environment.

The housing vent 412 can fluidly couple the battery cavity 408 and an external environment surrounding the image capture device 400. The housing vent 412 can include another seal (not shown), similar to seal 506, or other means of blocking particulates from moving between the battery cavity 408 and the external environment, but may at the same time allow air to pass or vent between the battery cavity 408 and the external environment. If air with increased humidity enters the housing vent 412, it may pass from the housing vent 412, to the battery cavity 408, along the lens vent 504, and into the lens cavity 502 under specific temperatures and pressure conditions. In some examples, the housing vent 412 may more easily distribute air or moisture between the battery cavity 408 and the external environment by providing a passive airflow mechanism for moving humidity.

Though a great majority of moisture or wetness is blocked from entering the housing 402 based on sealing (not shown) between various components within the image capture device 400, unintentional moisture introduction, such as loading a wet battery into the battery cavity 408 or operating the image capture device in a hot, humid environment for an extended period of time without the presence of a removable door (such as the removable door 115 of FIG. 1) may lead to a small amount of moisture moving between various cavities and vents (e.g., the battery cavity 408, the housing vent 412, the lens cavity 502, and the lens vent 504) within the housing 402 so as to risk fogging of the lens 500 or the lens cover 404 in certain operating environments. This moisture can be reduced or eliminated using the desiccant patch described in FIGS. 6A-7.

Figure 6A:
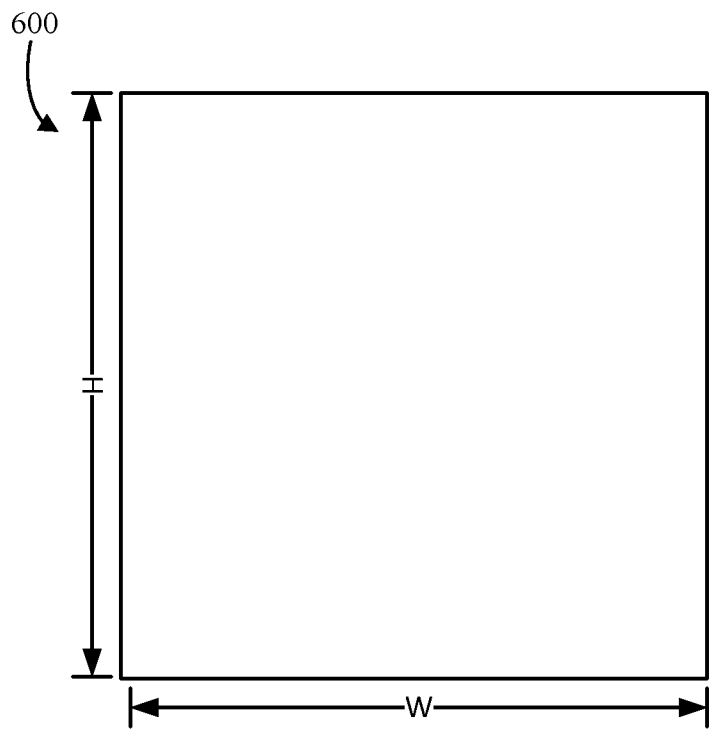
FIG. 6A is a top view of a desiccant patch.
Figure 6B:
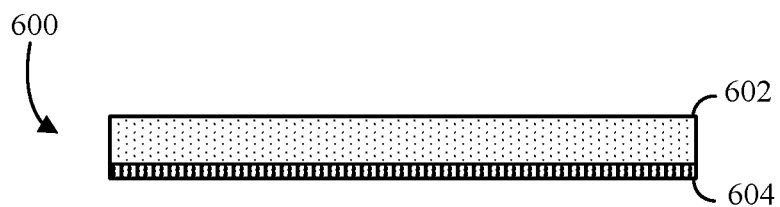
FIG. 6B is a side view of the desiccant patch of FIG. 6A.

FIGS. 6A and 6B show a top view (FIG. 6A) and a side view (FIG. 6B) of a desiccant patch 600. As best shown in FIG. 6A, the desiccant patch 600 can be generally square, having a first dimension, H, that measures between 15 mm and 35 mm, and a second dimension, W, that measures between 15 mm and 35 mm. The ranges are examples, as the desiccant patch 600 may be sized to be slightly smaller than a surface of a component, such as a side surface of a battery, as described herein in reference to FIG. 7.

As best shown in FIG. 6B, the desiccant patch 600 includes an absorbent layer 602 represented using a dotted pattern and an adhesive layer 604 represented using a vertical-line pattern. The absorbent layer 602 can be formed of a hygroscopic material, that is, a material sufficient to both absorb and retain moisture from the surrounding environment. Hygroscopic materials can include silica gel, sodium chloride, calcium chloride, copper sulfate, potassium carbonate, potassium hydroxide, lithium bromide, and/or sodium hydroxide, among other non-listed exampled. In one example, the absorbent layer 602 can be an absorbent paper including silica gel particles in a cellulose fiber matrix. The absorbent layer 602 can have a thickness between 0.1 mm and 0.6 mm and a water absorption capability of between 300 g/m$^2$ and 500 g/m$^2$. In another example, the absorbent layer can have a thickness between 0.2 mm and 0.4 mm and a wet burst resistance, that is, a wet strength or capability to resist rupture, between 75 kPa and 125 kPa. The absorbent layer 602 is designed to attract and capture any moisture that enters any of the fluidly coupled vents and cavities (e.g., the battery cavity 408, the housing vent 412, the lens cavity 502, and the lens vent 504) to reduce or remove the possibility of fogging for the lens cover 404 or the lens 500.

The adhesive layer 604 can be formed from a pressure-sensitive adhesive (PSA), such as an acrylic, acrylic foam, silicone, or other material, sufficient to adhere the desiccant patch 600 to a surface of a component in the image capture device 400. In one example, the adhesive layer 604 can have a thickness between 0.02 mm and 0.08 mm. In another example, the adhesive layer 604 can have a thickness between 0.03 mm and 0.05 mm. The surface receiving the adhesive layer 604 can be a side surface of a battery as described herein in reference to FIG. 7.

Figure 7:
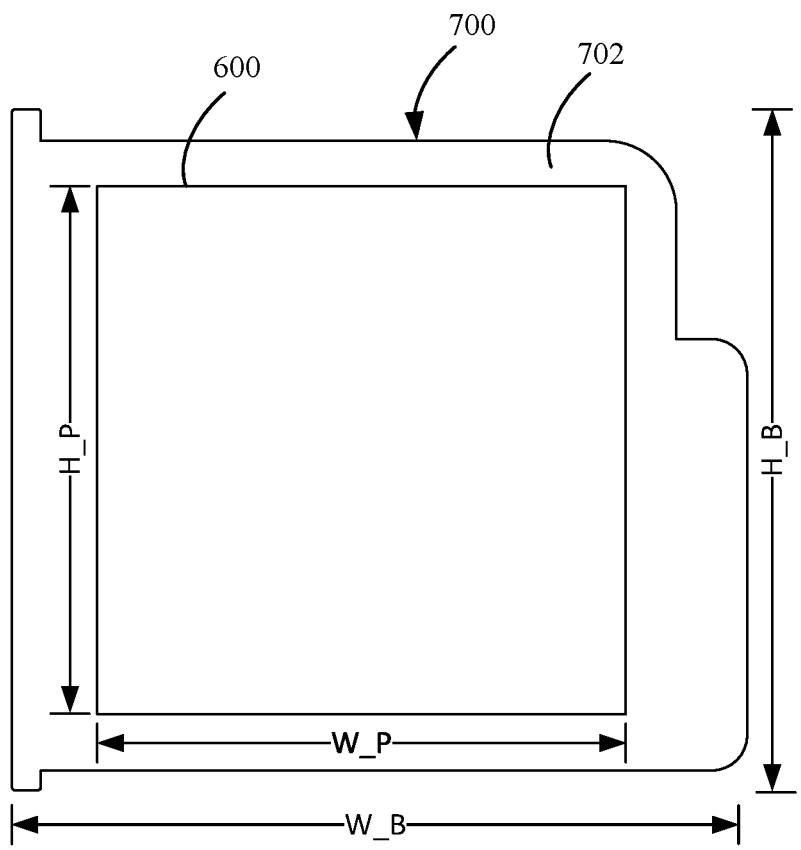
FIG. 7 is a side view of a battery including the desiccant patch of FIGS. 6A-6B.

FIG. 7 is a side view of a battery 700 including the desiccant patch 600 of FIGS. 6A-6B. The desiccant patch 600 is coupled to a side surface 702 of the battery 700, for example, using the adhesive layer 604 (see FIG. 6B) to couple the side surface 702 and the desiccant patch 600. The desiccant patch 600 of FIG. 7 is generally square with dimensions of height (H_P) and width (W_P) being equal or approximately equal. In contrast, the side surface 702 of the battery 700 has an irregular perimeter, with a height (H_B) greater than the height (H_P) of the desiccant patch 600 and a width (W_B) greater than the width (W_P) of the desiccant patch 600. The smaller size of the desiccant patch 600 as compared to the size of the side surface 702 of the battery 700 is intended to account for variation in application of the desiccant patch 600. In one example, the height H_P can be between 20 mm and 30 mm and the width W_P can be between 20 mm and 30 mm whereas the height H_B can be between 25 mm and 50 mm and the width W_B can be between 25 mm and 50 mm.

The desiccant patch 600 can be located on and adhered or otherwise coupled to the side surface 702 of the battery 700 prior to loading the battery 700 into a battery cavity such as the battery cavity 408 shown in the image capture device 400 in FIG. 4. When the desiccant patch 600 is coupled to the battery 700 and then loaded into a battery cavity such as the battery cavity 408 of the image capture device 400 shown in FIG. 4, any moisture that moves between vents (e.g., the housing vent 412 and the lens vent 504) and cavities (e.g. the battery cavity 408 and the lens cavity 502) along fluidly coupled passages within the housing 402 can be absorbed by the desiccant patch 600. Further, locating the desiccant patch 600 on the side surface 702 of the battery 700 allows the materials that form the absorbent layer 602 of the desiccant patch 600 to be directly exposed to the main fluid passages, for example, the housing vent 412 and the lens vent 504, within the image capture device 400 as shown in FIGS. 4 and 5.

When located on the side surface 702 of the battery 700 as shown and described in respect to FIG. 7, the desiccant patch 600 can attract and absorb moisture present within the housing 402, greatly reducing or removing the potential for fogging to occur on the lens 500 or the lens cover 404 as shown in FIG. 5. The side surface 702 to which the desiccant patch 600 is coupled can be any of the sides configured to fit into the battery cavity 408. In the example of FIG. 5, the battery 700 can be located within the battery cavity 408, and the side surface 702 of the battery 700 that includes the desiccant patch 600 can be positioned proximate to the housing vent 412 and the lens vent 504. In other examples, the desiccant patch 600 can be located on a side surface of the battery 700 opposite the housing vent 412 and the lens vent 504. The desiccant patch 600 can absorb moisture from within the housing 402 so long as any cavity, recess, and/or passage that includes moisture is in fluid communication with the battery cavity 408 where the desiccant patch 600 is located.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
    a housing;
    a lens cavity comprising an external lens that separates the lens cavity from an exterior environment, the lens cavity connected with an inside of the housing;
    a door positioned on the housing and configured to open the inside of the housing to the exterior environment; and
    a vent that extends from the inside of the housing to an external surface of the housing so that moisture can be vented from the housing and the lens cavity to the exterior environment after the door is opened and closed.

2. The image capture device of claim 1, wherein the vent comprises a seal configured to allow the moisture to pass and block particulates between the exterior environment and the housing.

3. The image capture device of claim 1, wherein the vent comprises a seal configured to open and close so that the moisture is controllably ventable from the housing and lens cavity.

4. The image capture device of claim 1, further comprising:
a removable battery configured to be inserted and removed from the inside of the housing through the battery door.

5. The image capture device of claim 1, further comprising:
an internal lens positioned within the lens cavity and separated from the external environment.

6. The image capture device of claim 5, wherein the vent is configured to vent the moisture from the lens cavity and the housing so that the internal lens and/or the external lens is free of fog.

7. The image capture device of claim 1, further comprising:
a channel that connects the inside of the housing and the lens cavity.

8. The image capture device of claim 1, wherein the channel comprises a seal configured to block particulates from passing between the inside of the housing and the lens cavity and allow moisture to pass between the housing and the lens cavity.

9. An image capture device, comprising:
a housing;
a lens cavity;
a channel that fluidly connects the lens cavity and the housing;
a removable lens configured to connect with and enclose the lens cavity; and
a vent that is switchable between an open and closed position, extends between an inside of the housing an external environment, and is configured to release air and/or moisture from the lens cavity and the housing when the removable lens is connected with and encloses the lens cavity.

10. The image capture device of claim 9, further comprising:
an internal lens assembly disposed in the channel.

11. The image capture device of claim 9, wherein the internal lens assembly comprises an image sensor.

12. The image capture device of claim 9, further comprising:
a battery door positioned on the housing; and
a battery positioned within the housing, spaced a distance from the channel, and configured to be inserted and removed through the battery door.

13. The image capture device of claim 9, further comprising a seal that is disposed in the vent when the vent is in a closed position and is removed from the vent when the vent is in an open position.

14. The image capture device of claim 9, wherein the channel comprises a seal that is configured to allow moisture to flow between the housing and the lens cavity and prevent the flow of particulates between the housing and the lens cavity.

15. An image capture device, comprising:
a housing;
a lens assembly that is free of a fluid connection with an exterior environment;
a channel that fluidly connects the lens assembly and the housing;
a door positioned on the housing;
a removable battery configured to be moved through the door; and
a vent that extends between an inside of the housing and the exterior environment and is configured to vent moisture from the inside of the housing and the lens assembly to prevent fog from obstructing the lens assembly when the vent is open,
wherein the housing is free of fluid connection with the exterior environment when the door is closed and the vent is closed.

16. The image capture device of claim 15, wherein the vent is configured equalize pressure between the housing and the exterior environment when the vent is open.

17. The image capture device of claim 15, wherein the channel comprises a seal that is configured to prevent particulates from traveling between the housing and the lens assembly.

18. The image capture device of claim 17, wherein the seal surrounds the lens assembly.

19. The image capture device of claim 15, wherein the vent comprises a seal that is configured to allow air and moisture and prevent particulates from flowing between the housing and the external environment when the vent is open.

20. The image capture device of claim 15, wherein the lens assembly comprises:
an internal lens that is free of contact with the exterior environment; and
an external lens that has a surface exposed to the exterior environment.

* * * * *

UNITED STATES PATENT AND TRADEMARK OFFICE
CERTIFICATE OF CORRECTION

PATENT NO. : 11,818,448 B2
APPLICATION NO. : 18/071131
DATED : November 14, 2023
INVENTOR(S) : Joseph Tucker and Matthew Feddersen It is certified that error appears in the above-identified patent and that said Letters Patent is hereby corrected as shown below:

On the Title Page

Item (57) In the Abstract, Line 7:
Add --the-- before "housing"

Item (57) In the Abstract, Line 8:
Add --the-- before "housing"

In the Claims

In Claim 9, Column 15, Line 39:
Add --and-- between "an inside of the housing" and "an"

Signed and Sealed this
Eighth Day of October, 2024

Katherine Kelly Vidal
*Director of the United States Patent and Trademark Office*